(12) United States Patent
Yamaguchi

(10) Patent No.: US 8,896,865 B2
(45) Date of Patent: Nov. 25, 2014

(54) PRINTING SYSTEM, WORKFLOW MANAGEMENT METHOD FOR PRINTING SYSTEM, AND PROGRAM THEREFOR

(75) Inventor: Naohiro Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 13/527,309

(22) Filed: Jun. 19, 2012

(65) Prior Publication Data

US 2013/0003119 A1    Jan. 3, 2013

(30) Foreign Application Priority Data

Jun. 29, 2011   (JP) ................. 2011-144658

(51) Int. Cl.
*G06K 15/02* (2006.01)
*G06F 3/12* (2006.01)

(52) U.S. Cl.
CPC ............ *G06F 3/121* (2013.01); *G06F 3/1234* (2013.01); *G06F 3/1212* (2013.01); *G06F 3/1264* (2013.01); *G06F 3/1285* (2013.01); *G06F 3/1282* (2013.01); *G06F 3/1275* (2013.01); *G06F 3/1259* (2013.01)
USPC ................ 358/1.15; 358/1.13; 358/1.14

(58) Field of Classification Search
USPC ............................. 358/1.14, 1.15
See application file for complete search history.

(56) References Cited

U.S. PATENT DOCUMENTS

| | | | |
|---|---|---|---|
| 6,914,696 B1 * | 7/2005 | Kojima et al. | 358/1.16 |
| 2010/0315674 A1 * | 12/2010 | Shimizu | 358/1.15 |
| 2012/0212769 A1 * | 8/2012 | Gaertner et al. | 358/1.15 |

FOREIGN PATENT DOCUMENTS

JP    2010-097242 A    4/2010

* cited by examiner

*Primary Examiner* — Marivelisse Santiago Cordero
*Assistant Examiner* — Darryl V Dottin
(74) *Attorney, Agent, or Firm* — Canon USA, Inc., IP Division

(57) ABSTRACT

A printing system includes a post-processing apparatus and an information processing apparatus. The post-processing apparatus applies post processing to a sheet material output from a printing apparatus related to execution of a print job. The information processing apparatus manages a print workflow that associates an operation executed by the post-processing apparatus with a first operation performed by a worker managing the first operation or a serviceman maintaining the printing apparatus. The apparatus generates a print workflow, acquires operation information related to a component to be replaced in the print job, and determines whether the component needs to be replaced during the execution of the print job. In response to determining that the component needs to be replaced, the apparatus distinguishes whether the component characteristic affects image quality or bookkeeping quality, decides an operation position, and updates the print workflow by incorporating the component replacement operation into the operation position.

16 Claims, 18 Drawing Sheets

| COMPONENT NAME | ID | PREVIOUS REPLACEMENT | COUNTER |
|---|---|---|---|
| .... | | | |
| TONER #CY | 0002-00001 | 20110202 | 15454/20000 |
| TONER #MG | 0002-00002 | 20110203 | 13439/20000 |
| .... | | | |
| ROLLER #1 | 0008-02422 | 20110115 | 154545/250000 |
| ROLLER #2 | 0008-02423 | 20110129 | 245466/250000 |
| .... | | | |
| WASTE TONER DEVICE | 0010-00043 | 20110203 | 3417/5000 |
| PAPER PUNCHING DEVICE | 0010-00044 | 20110131 | 6545/8000 |
| .... | | | |
| DEVELOPMENT DEVICE #1 | 0034-00039 | 20101214 | 21751/50000 |
| DEVELOPMENT DEVICE #2 | 0034-00040 | 20110115 | 46415/50000 |
| .... | | | |
| FIXING DEVICE #1 | 0068-00109 | 20110202 | 164426/500000 |
| FIXING DEVICE #2 | 0068-00110 | 20110203 | 169544/300000 |
| FIXING DEVICE #3 | 0068-00111 | 20110202 | 245455/300000 |
| .... | | | |
| POWER SUPPLY UNIT #1 | 0088-00026 | 20100519 | 245/1000 |
| POWER SUPPLY UNIT #2 | 0088-00027 | 20100519 | 245/1000 |
| POWER SUPPLY UNIT #3 | 0088-00028 | 20100519 | 245/1000 |
| .... | | | |
| CUTTING EDGE #1 | 0092-00008 | 20110110 | 45762/100000 |
| CUTTING EDGE #2 | 0092-00009 | 20110110 | 7124/55000 |
| CUTTING ROLLER #1 | 0092-00010 | 20110131 | 64245/200000 |
| .... | | | |

FIG.9

| COMPONENT NAME | ID | WORKER | IMAGE QUALITY ADJUSTMENT | HW ADJUSTMENT | REPLACEMENT PROCEDURE | STANDARD WORK TIME |
|---|---|---|---|---|---|---|
| .... | | | | | | |
| TONER #CY | 0002-00001 | OP | 1, CAL | | 0002-00001.html | 0:10:00 |
| TONER #MG | 0002-00002 | OP | 1, CAL | | 0002-00002.html | 0:10:00 |
| .... | | | | | | |
| ROLLER #1 | 0008-02422 | OP | 0 | | 0001-02422.html | 0:20:00 |
| ROLLER #2 | 0008-02423 | OP | 1, CAL, CHK | 1 | 0001-02423.html | 0:30:00 |
| .... | | | | | | |
| WASTE TONER DEVICE | 0010-00043 | OP | 0 | | 0010-00043.html | 0:10:00 |
| PAPER PUNCHING DEVICE | 0010-00044 | OP | 0 | | 0010-00044.html | 0:10:00 |
| .... | | | | | | |
| DEVELOPMENT DEVICE #1 | 0034-00039 | SR | 1, CAL, CHK | | 0034-00039.html | 1:00:00 |
| DEVELOPMENT DEVICE #2 | 0034-00040 | OP | 1, CAL, CHK | | 0034-00040.html | 0:40:00 |
| .... | | | | | | |
| FIXING DEVICE #1 | 0068-00109 | SR | 1, CAL, CHK | | 0068-00109.html | 1:00:00 |
| FIXING DEVICE #2 | 0068-00110 | SR | 1, CAL, CHK | | 0068-00110.html | 1:00:00 |
| FIXING DEVICE #3 | 0068-00111 | OP | 1, CAL, CHK | | 0068-00111.html | 0:40:00 |
| .... | | | | | | |
| POWER SUPPLY UNIT #1 | 0088-00026 | SR | 0 | | 0088-00026.html | 2:00:00 |
| POWER SUPPLY UNIT #2 | 0088-00027 | SR | 0 | | 0088-00027.html | 1:30:00 |
| POWER SUPPLY UNIT #3 | 0088-00028 | SR | 0 | | 0088-00028.html | 1:30:00 |
| .... | | | | | | |
| CUTTING EDGE #1 | 0092-00008 | SR | 0 | 1 | 0092-00008.html | 0:30:00 |
| CUTTING EDGE #2 | 0092-00009 | SR | 0 | 1 | 0092-00009.html | 0:30:00 |
| CUTTING ROLLER #1 | 0092-00010 | OP | 0 | 1 | 0092-00010.html | 0:30:00 |
| .... | | | | | | |

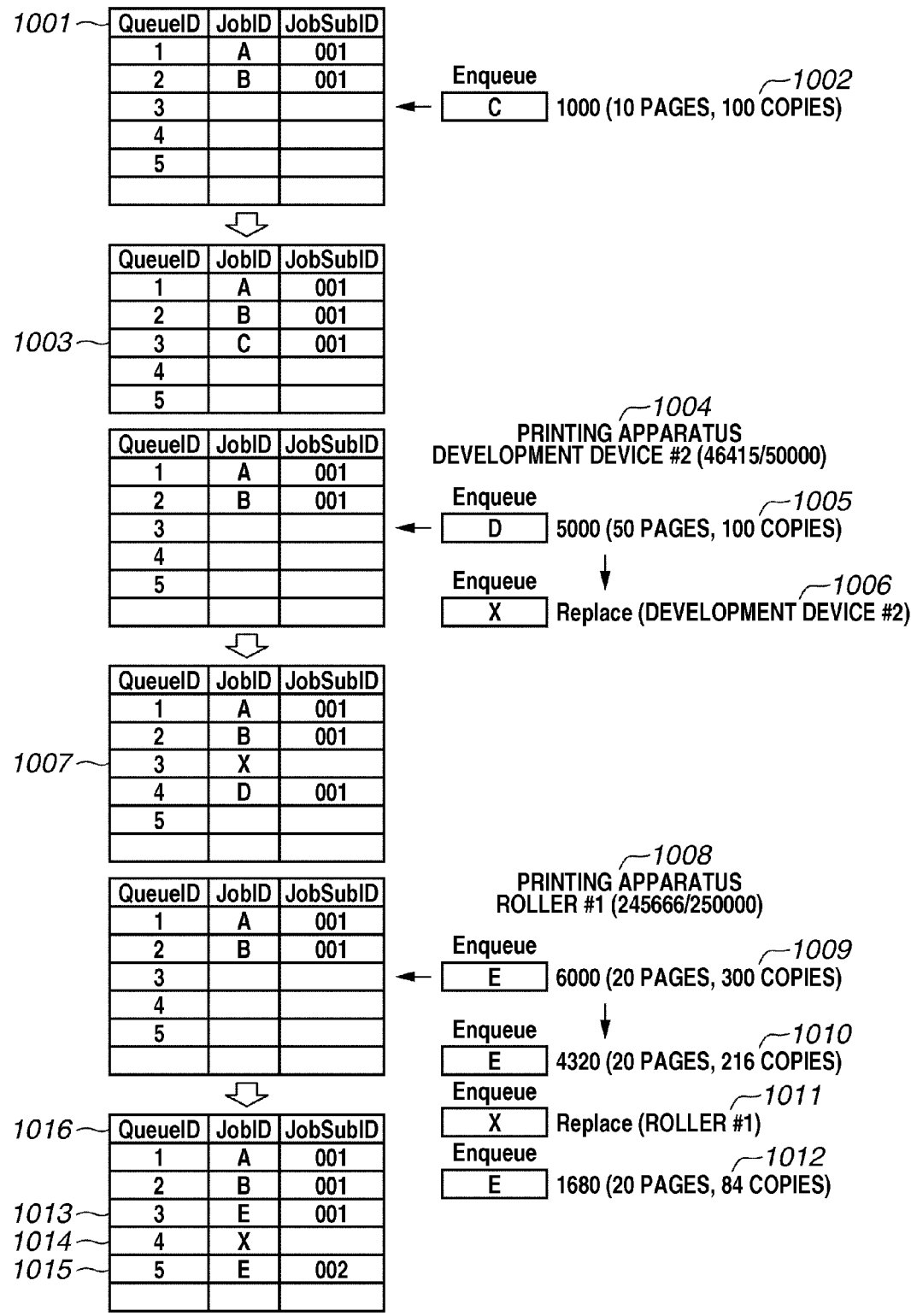

FIG.12

| Job No. | JobID | JobSubID | Owner | Operation | Schedule | |
|---|---|---|---|---|---|---|
| | | | | | StartTime | EndTime |
| 0002455 | 054321 | 001 | Operator A | Print, 20p. 216Copies | 2011-03-23-09-20 | 2011-03-23-10-30 |
| 0002456 | 054321 | | Operator A | Replace, Roller #1 | 2011-03-23-10-40 | 2011-03-23-11-00 |
| 0002457 | 054321 | 002 | Operator A | Print, 20p. 84Copies | 2011-03-23-11-10 | 2011-03-23-11-50 |
| 0002458 | 054322 | | Operator B | Replace, Fuser #4 | 2011-03-23-13-00 | 2011-03-23-13-30 |
| 0002459 | 054322 | 001 | Operator B | Print, 40p. 110Copies | 2011-03-23-13-40 | 2011-03-23-15-20 |
| 0002460 | 054322 | | Operator B | Replace, Roller #2 | 2011-03-23-15-30 | 2011-03-23-15-50 |
| 0002461 | 054322 | 002 | Operator B | Print, 40p. 190Copies | 2011-03-23-16-00 | 2011-03-23-18-30 |
| | | | | ... | | |

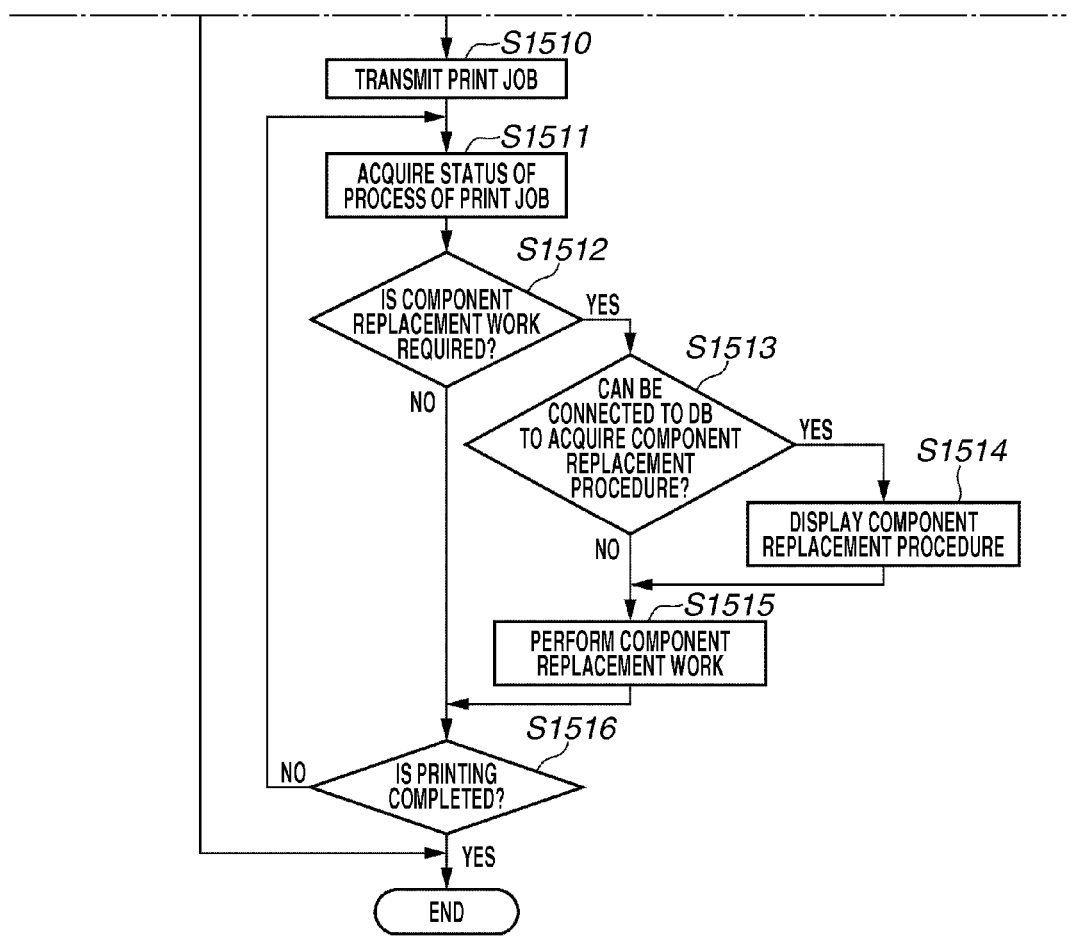

FIG.16
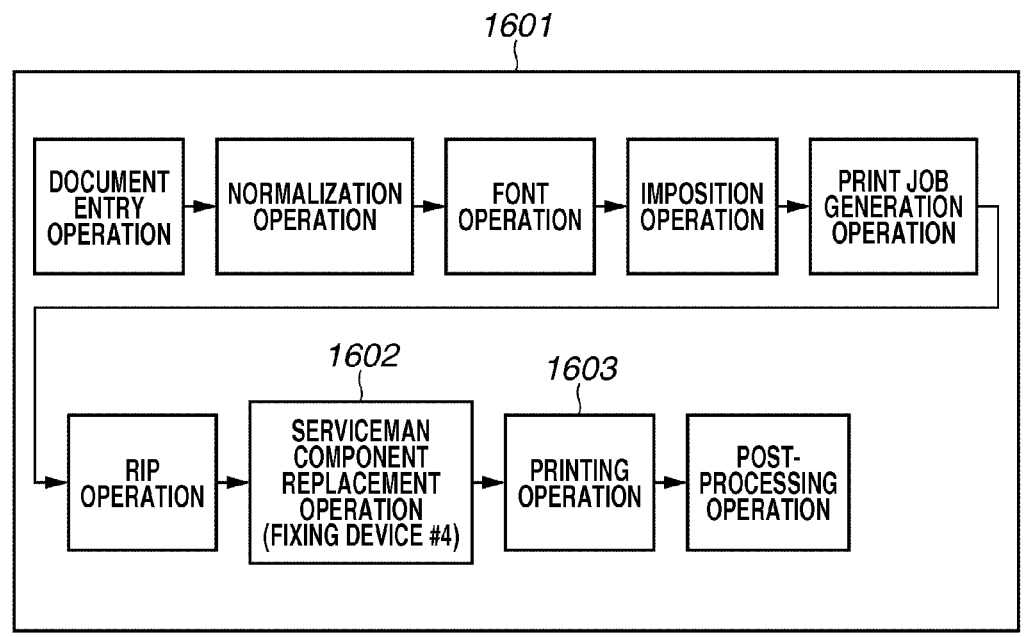
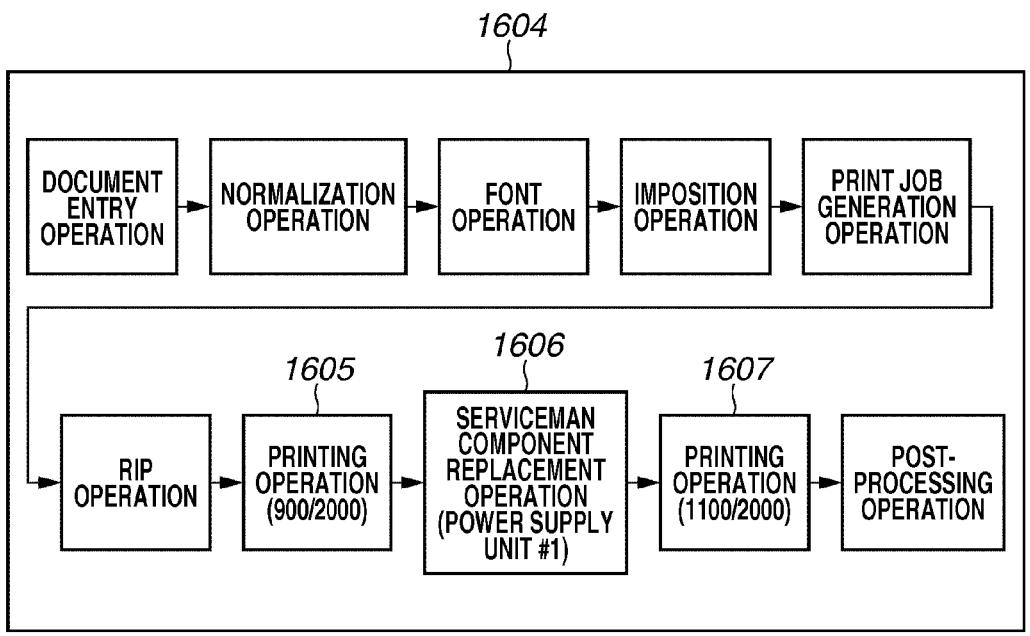

PRINTING SYSTEM, WORKFLOW MANAGEMENT METHOD FOR PRINTING SYSTEM, AND PROGRAM THEREFOR

BACKGROUND OF THE INVENTION

1. Field of the Invention

The present invention relates to a printing apparatus, a printing system including a post-processing apparatus, a workflow management method for printing system, and a program therefor.

2. Description of the Related Art

In recent years, Print on Demand (POD) printing using a digital printing machine has become widely known. Unlike conventional printing in which a printing plate is formed to perform printing, the POD printing edits and processes original image data for each print job every time printing is performed to generate print image data and set print appearance to perform print processing.

A printed paper is sometimes processed by a post-processing apparatus to add value to a print product. A series of processing for such a print job is defined as aggregation of steps associated with print jobs (print workflow).

Software which constructs a print work flow to manage each step for a print job is referred to as a print workflow system. In the print workflow system, an operator who operates the system and each apparatus, defines a series of steps for producing a print product based on the request of a customer. The customer places an order for the print product and the operator inputs contents of each step. The print workflow system predicts work time of each step performed by the operator in the defined work flow and manages the work time associated with the print job as a work schedule. Time information based on the work schedule is used for cost calculation as operation information of the operator and each apparatus.

The print workflow system sends the definition of the input print product along with print image data as a print job to an apparatus for executing each step and causes the apparatus to execute the print job. At this point, the print workflow system communicates with each apparatus to acquire status of each apparatus and execution status and results for each print job, acquiring the progress of each step. Comparing the information with the work schedule formed before the processing improves a time prediction accuracy at the time of constructing a subsequent similar print workflow.

Each apparatus temporarily interrupts processing in case any problem occurs while the apparatus is processing a print job or before or after the apparatus processes the print job. At the same time, the apparatus displays a message indicating that the problem occurs to urge the operator or a serviceman who carries out maintenance of the apparatus to solve the problem, and transmits the information to the print workflow system. The print workflow system that receives the information displays on a user interface (UI) a notification that the problem occurs in the print job which is being executed to inform the operator thereof. If measures for addressing the problem are taken in each apparatus to restore the print job to a processable state, each apparatus transmits information indicating that the apparatus state is recovered, to the print workflow system. The print workflow system changes the display as to the print job on the UI.

With respect to such print workflow system that communicates with each apparatus to manage information about the progress of the print job and the status of each apparatus, a technique is known that predicts time for replacing consumables from information indicating a state of consumption of ink, tonner, and paper managed by each apparatus.

The operator is notified in advance of replacement time by displaying time for replacing consumables on the UI of the apparatus based on the contents which predict time for replacing consumables. Furthermore, another technique is known which provides the operator with feasible print contents in terms of the contents of print image data and jobs in the print job executed at the predicted time of replacing consumables (refer to Japanese Patent Application Laid-Open No. 2010-97242, for example). The operator of the print workflow system can determine whether the print job can be processed by these techniques before each apparatus actually processes the print job.

In the POD printing performed using the print workflow system, it is assumed that image data and document with the enormous number of pages and a large number of copies are printed at one time as one print job.

While the print job for outputting such a large amount of print products is being processed by a processing apparatus, failure of the apparatus components may suddenly occur due to the end of the components lifetime and the print workflow is interrupted. In a case the failure occurs, in general, the operator notifies the serviceman of the failure and the serviceman arrives at a site and performs repairs. This means that it can take long time until the processing of the print job is resumed after the failure occurs and the apparatus is repaired.

As recovery works for the interrupted printing apparatus, the operator may have to not only replace failed components, but also remove paper jammed in the printing apparatus and replenish again consumables such as paper, ink, and tonner.

In addition, after the apparatus is repaired, adjustment work such as the restoration of the print apparatus to the operation condition and state before the occurrence of the failure has to be performed to resume the interrupted print job at the time of restarting the apparatus.

Due to such restoration work unexpected in constructing the print workflow, the predicted work time of the operator and cost information calculated based on the predicted work time becomes different from the results of actual processing.

Further, the replacement of components of the apparatus can case difference in quality between the print products which are an outcome of the print job, before and after the replacement of components. In an electrophotographic digital printing machine, for example, the replacement of components such as a developer, a fixing device, an intermediate transfer belt influences print quality.

Furthermore, there is a cutting machine as one of apparatuses used in post-processing step for processing and forming printed paper. When its cutting edge is replaced, processing accuracy may be changed which possibly affects a cutting position and a shape of a cutting face.

If the print job is thus interrupted while being processed, a restoration work can make quality different before and after the output product of the same print job is interrupted.

SUMMARY OF THE INVENTION

The present invention provides a mechanism that can form or modify a print workflow capable of reducing influence on image quality even if a component replacement step is incorporated, in a case where the replacement of components during the execution of a print job affects image quality.

According to an aspect of the present invention, a printing system includes a post-processing apparatus configured to apply post processing to a sheet material output from a printing apparatus related to execution of a print job, and an information processing apparatus configured to manage a print workflow that associates an operation executed by the post-processing apparatus with a first operation performed by a worker managing the first operation or a serviceman maintaining the printing apparatus, wherein the information processing apparatus includes a generation unit configured to generate a print workflow using the printing apparatus and the post-processing apparatus in accordance with a print setting condition set to the print job, an acquisition unit configured to acquire operation information related to a component to be replaced in the print job executed by the printing apparatus, a determination unit configured to determine whether the component needs to be replaced during the execution of the print job, based on the operation information acquired by the acquisition unit and print setting set to the print job, a distinguishing unit configured to distinguish, in response to the determination unit determining that the component needs to be replaced, whether the component is a component whose characteristic affects image quality or bookkeeping quality, a decision unit configured to decide an operation position where a component replacement operation is incorporated into a plurality of operations of the print workflow generated by the generation unit according to the characteristic of the component distinguished by the distinguishing unit, and an update unit configured to update the print workflow generated by the generation unit by incorporating the component replacement operation into the operation position decided by the decision unit.

The embodiments can form and change a print workflow capable of reducing influence on image quality even if a component replacement operation is incorporated in a case where the replacement of components during the execution of a print job affects image quality.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a table illustrating an example of data managed in a component management database.

FIG. 9 is a table illustrating information about component replacement workers stored in the component management database.

FIG. 10 is a schematic diagram of a print job queue managed by a print job management unit.

FIG. 12 is a table illustrating an example of a work list for an operator displayed on a display unit.

FIG. 16 is a block diagram illustrating an example of the print WF of the print workflow system.

DESCRIPTION OF THE EMBODIMENTS

Various exemplary embodiments, features, and aspects of the invention will be described in detail below with reference to the drawings.

[Description of System Configuration]

Figure 1:
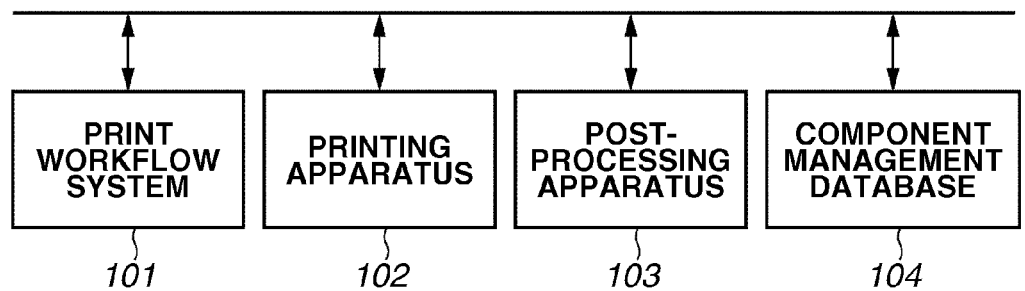
FIG. 1 is a block diagram illustrating a configuration of a printing system.

FIG. 1 is a block diagram illustrating a configuration of a printing system according to a first exemplary embodiment. The system is an example of the printing system for managing a printing apparatus for executing a print job and a print workflow with a step performed by an operator or a serviceman. The step performed by an operator or a serviceman is associated with a step executed by a post-processing apparatus for a sheet material output from the printing apparatus.

In FIG. 1, the printing system includes a print workflow system 101, a printing apparatus 102 for performing print processing via a network, a post-processing apparatus 103 for post-processing a sheet, and a component management database 104 for managing component information. These systems are connected to one another via the network to communicate with one another.

Figure 2:
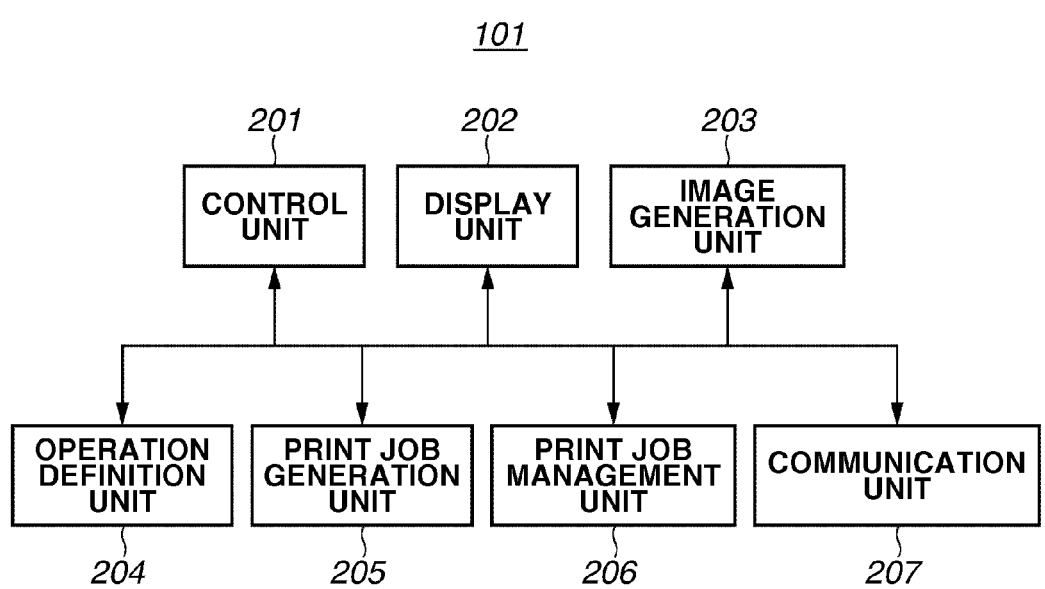
FIG. 2 is a block diagram illustrating a configuration of a print workflow system.

FIG. 2 is a block diagram illustrating a configuration of the print workflow system 101 illustrated in FIG. 1. The print workflow system 101 described in the present exemplary embodiment is configured of an information processing apparatus including a so-called computer. A print workflow management program for totally controlling the print workflow system 101 is installed into the information processing apparatus. A central processing unit (CPU) totally controls print workflow processing using memory resources such as a random access memory (RAM).

In the present exemplary embodiment, a control unit 201 executes the print workflow management program to execute the following functional processing.

First functional processing is a creation processing for creating the print workflow using the printing apparatus and the post-processing apparatus in accordance with print setting conditions set to the print job. Second functional processing is an acquisition processing for acquiring operation information about components to be replaced along with the print job executed by the printing apparatus.

Third functional processing is a determination processing for determining whether the components need to be replaced during the execution of the print job based on the acquired operation information and the print setting set to the print job. Fourth functional processing is an identification processing for identifying whether a component is the one whose characteristic affects image quality or the one whose characteristic affects bookbinding quality if it is determined that the component needs to be replaced.

Fifth functional processing is a determination processing for determining a position where the component replacement step is incorporated among a plurality of steps of the print workflow created by the creation unit, in accordance with the characteristics of the component to be identified. Sixth functional processing is an update processing for updating the print workflow created by the creation unit by incorporating the component replacement step into the determined position. The steps are executed based on a flow chart described below to execute their respective functional processing.

In FIG. 2, the control unit 201 controls each module in the print workflow system 101 described below and determines the operation of the entire system. A display unit 202 displays internal operation state and result, for the operator of the print workflow system based on the control of the control unit 201. If the display unit 202 is formed of a touch panel, the display unit 202 receives operation from the operator (user) via a UI screen displayed on the touch panel and notifies the control unit 201 thereof.

In the present exemplary embodiment, display control for displaying the created print workflow or the updated print workflow is performed using a user interface (not illustrated), and the control unit 201 may notify the operator of an appropriate state of the print job. An image generation unit 203 generates print image data to be printed by the printing apparatus 102. The image generation unit 203 performs imposition processing in which a print image is arranged according to the contents of a final print product.

A step definition unit 204 defines each step of the print job for producing a print product from the operation performed by the operator according to the control of the control unit 201. A print job generation unit 205 generates the print job from the print image data generated by the image generation unit 203, the image input at the display unit 202, and the process step determined by the step definition unit 204.

A print job management unit 206 includes a print job queue for managing the print job and manages the print job generated by the print job generation unit 205 according to the control unit 201. A communication unit 207 performs communication processing with other communication devices connected to the network according to the control of the control unit 201. The communication unit 207 transmits the print job to an external device connected to the network and communicates with the external device to acquire progress status.

Figure 3:
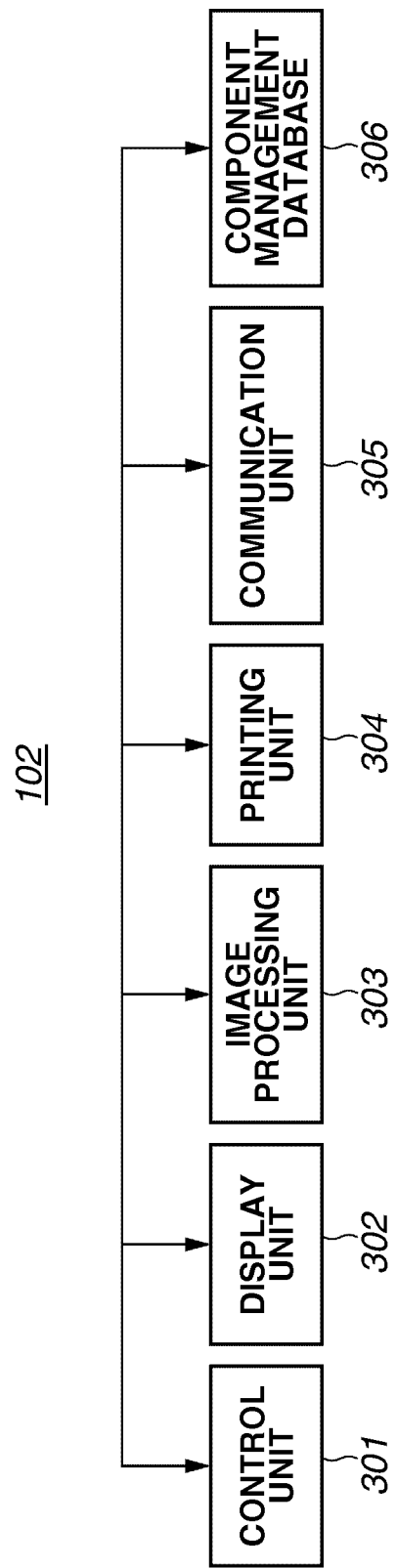
FIG. 3 is a block diagram illustrating a configuration of a printing apparatus illustrated in FIG. 1.

FIG. 3 is a block diagram illustrating a configuration of the printing apparatus 102 illustrated in FIG. 1. In FIG. 3, a control unit 301 controls each module in the printing apparatus described below and determines the operation of the entire apparatus. A display unit 302 displays internal operation state and result, for the operator of the printing apparatus 102 based on the control of the control unit 301. If the display unit 302 is formed of a touch panel, the display unit 302 receives UI operation from the operator and notifies the control unit 301 thereof.

An image processing unit 303 processes print image data included in the print job based on the print appearance specified in the print job to convert the data into an image suited for printing. The image processing unit 303 performs raster image processing (RIP). By the RIP, a vector image typified by PostScript (registered trademark) and Portable Document Format (PDF) is processed to convert the image into a raster image.

The RIP may be performed inside the image processing unit 303 or a module of the external device (a server apparatus) connected to the network. In other words, in a cloud computing environment where the server apparatus provides the RIP service, the above external device may be requested to perform the RIP and output RIP results.

A printing unit 304 prints print image data processed by the image processing unit 303 in accordance with the print appearance specified in the print job. A communication unit 305 performs communication processing with other communication devices connected to the network according to the control of the control unit 301. The communication unit 305 receives the print job created by the print workflow system 101 connected to the network and notifies the external device of the state of the printing apparatus. A component management database 306 manages information indicating the present durability of a component worn by the print processing among the components constituting the printing apparatus 102.

Figure 4:
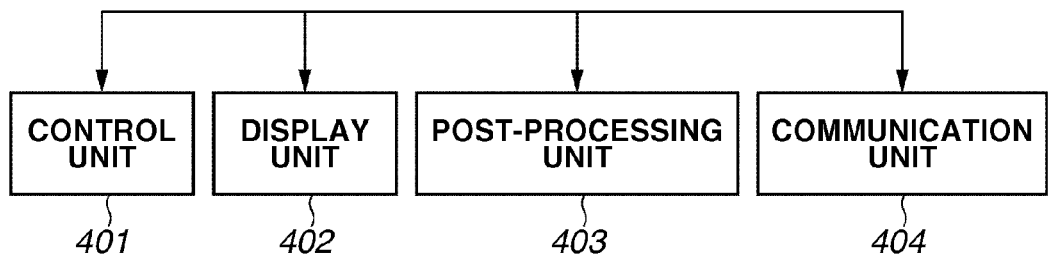
FIG. 4 is a block diagram illustrating a configuration of a post-processing apparatus illustrated in FIG. 1.

FIG. 4 is a block diagram illustrating a configuration of the post-processing apparatus 103 illustrated in FIG. 1. In the present exemplary embodiment, the post-processing of a print product mainly includes a binding processing in which the print product is bound by a staple, a folding processing in which the print product is folded, and a perforating processing in which the print product is perforated. Furthermore, the post-processing includes collation processing in which the print product is arranged in the specified order, cutting processing in which the print product is cut in the specified size, binding processing, and surface processing in which surface is processed such as laminate processing and titling.

In FIG. 4, a control unit 401 controls each module in the post-processing apparatus 103 described below and determines the operation of the entire apparatus.

A display unit 402 displays internal operation state and result for the operator of the post-processing apparatus 103 based on the control of the control unit 401. If the display unit 402 is formed of a touch panel, the display unit 402 receives UI operation from the operator and notifies the control unit 401 of the operation.

A post-processing unit 403 subjects the print product printed by the printing apparatus 102 to post-processing based on the information specified in the print job. A communication unit 404 performs communication processing with other communication devices connected to the network according to the control of the control unit 401.

Figure 5:
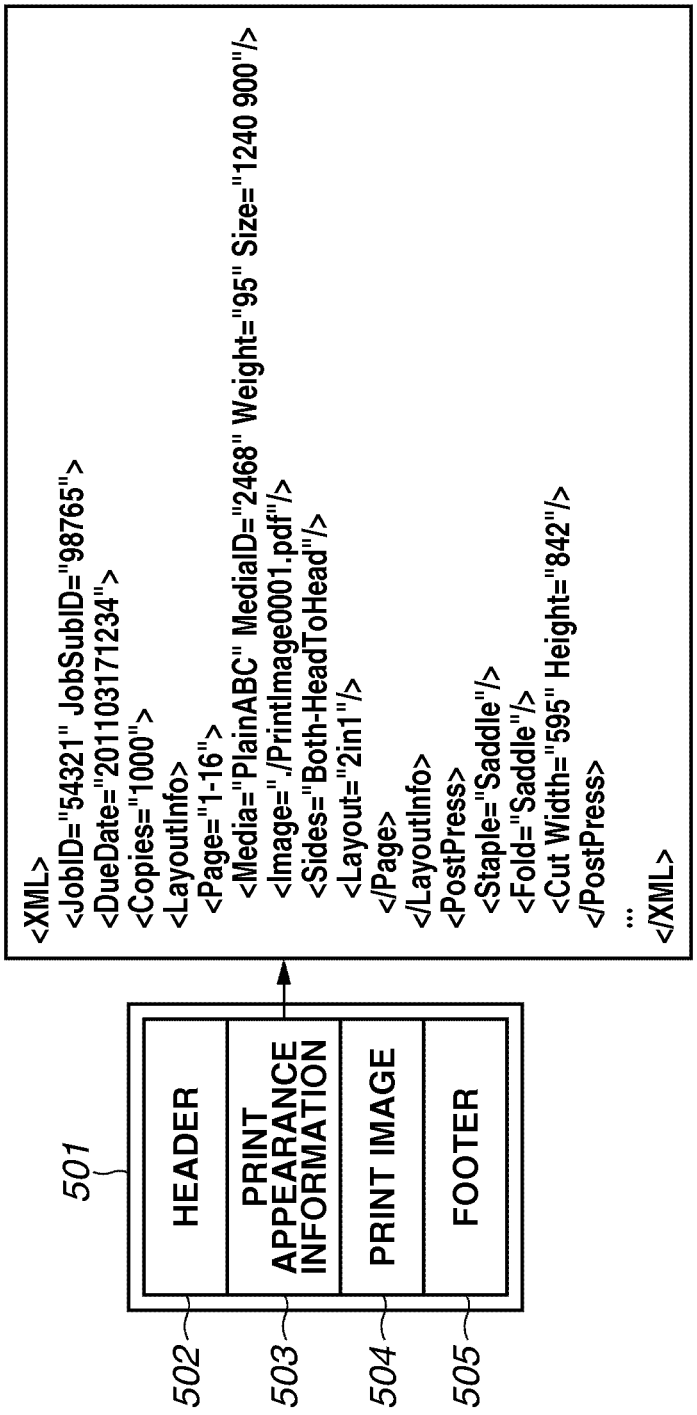
FIG. 5 is a diagram illustrating a schematic configuration of a print job generated by a print job generation unit.

FIG. 5 is a diagram illustrating a schematic configuration of the print job generated by the print job generation unit 205 illustrated in FIG. 2.

In FIG. 5, a print job 501 includes file header information 502, print appearance information 503, and print image data 504.

The file header information 502 controls the configuration of the print job 501 and is linked to components included in the file. The print appearance information 503 includes a unique ID in the print job to control the ID in association with information about a customer who places an order for the print product. The print appearance information 503 includes a structure of a print product, a link to print image data used for printing, a method for laying out the print image data, and information specifying paper and post-processing.

A print image data 504 is the one that is generated in the image generation unit 203 illustrated in FIG. 2 and is used for printing. As examples of the print image data, vector image data such as PostScript (registered trademark) data and PDF data or raster image data such as tag image file format (TIFF), joint photographic expert group (JPEG), and RAW data can be used.

The print image data 504 may be included in the print job file or the entity of the image data is stored in another area on a network to which the printing system is accessible and the print appearance information 503 may have a link to a reference destination.

Figure 6:
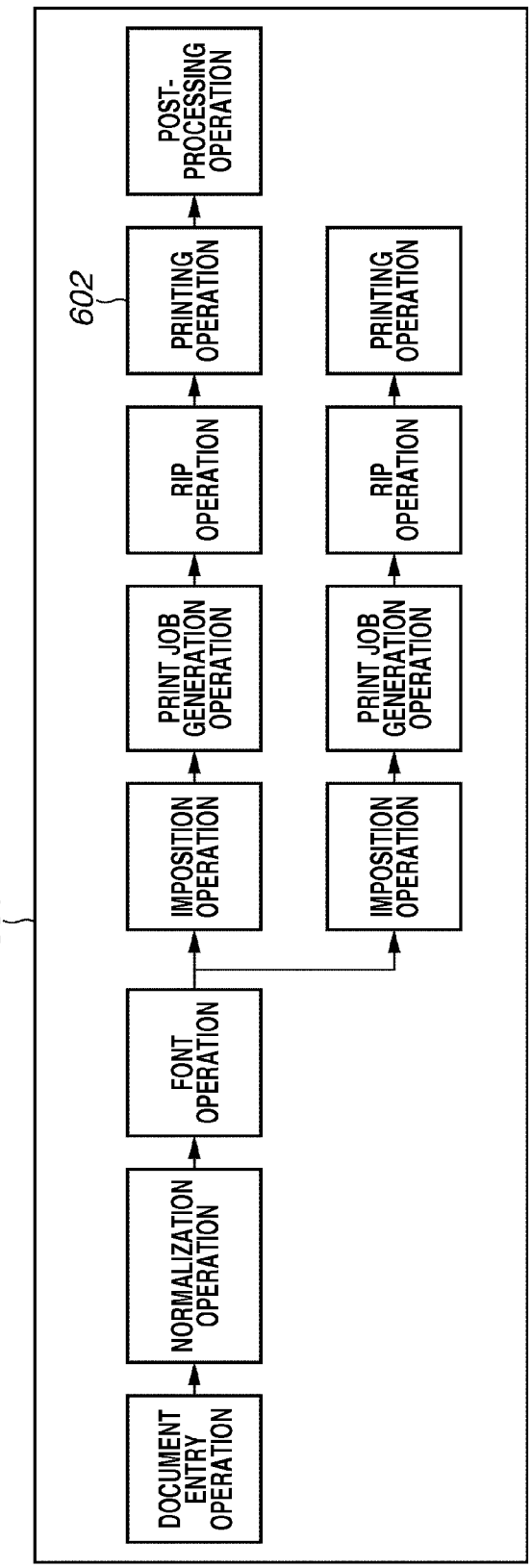
FIG. 6 is a block diagram illustrating an example of a print workflow (WF) of the print workflow system.

In the present exemplary embodiment, the concept of a print workflow defined by the print workflow system is described below with reference to FIG. 6. FIG. 6 is a block diagram illustrating an example of a workflow (WF) of the print workflow system according to the present exemplary embodiment.

In FIG. 6, the entire print workflow system 601 includes a plurality of process steps 602 in each apparatus for processing the print job. A required step is selected based on the operation of the operator on the display unit 202 of the print workflow system 101, each process step is arranged in order of process, and a mutual relationship is defined. The display unit 202 waits for the operator to input further detailed setting in the step.

Figure 7:
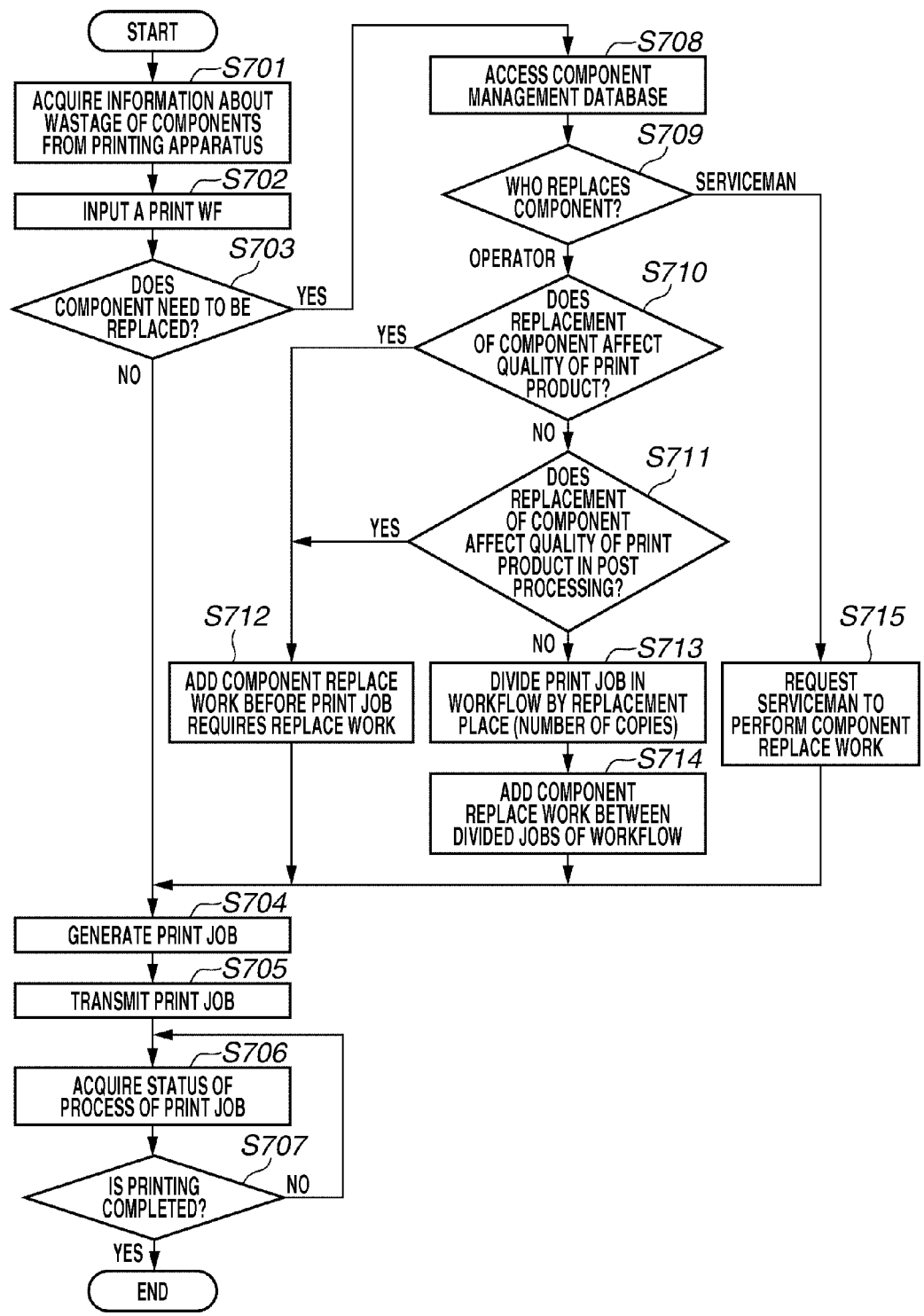
FIG. 7 is a flow chart illustrating a data processing method of the printing system.

The process performed by the print workflow system 101 is described below with reference to FIG. 7. FIG. 7 is a flowchart illustrating a data processing method of the printing system according to the present exemplary embodiment. The present exemplary embodiment is an example in which the print workflow system 101 automatically inserts a replacement operation process into the operation process of the print job based on the type of components to be replaced during the printing of the print job.

Each step in the flow chart is realized by the CPU functioning as the control unit 201 of the print workflow system 101 loading a control program from the external storage device such as a hard disk drive (HDD) onto the RAM and executing the control program. The following describes a process in which the control unit 201 determines whether a component can be replaced by an operator operating the information processing apparatus or a serviceman who serves as a worker performing a component replacement work at a component replacement process to update the print workflow.

If it is determined that the component can be replaced by the operator, the control unit 201 executes a process to identify whether the characteristic of the component affects image quality or bookbinding quality.

In step S701, the control unit 201 acquires information indicating a state of wastage of each component used in the printing apparatus 102 connected via the network from the communication unit 207. The printing apparatus 102 includes the component management database 306, so that the control unit 201 acquires information indicating a state of wastage of each component from the component management database 306 of the printing apparatus 102.

FIG. 8 is an example of data managed in the component management database 306 of the printing apparatus 102 illustrated in FIG. 3. The example is table data indicating a state of wastage of components in the printing apparatus 102. Therefore, the control unit 201 acquires data shown in the table from the component management database 306.

In FIG. 8, the component management database 306 manages an ID 802, a previous replacement date 803, and a counter 804 for each component name 801. The counter 804 counts operation information about a component to be replaced, for each component.

More specifically, the component name 801 is managed by data composed of the previous replacement date 803 indicating a date when a component was replaced last time and a count value of the counter 804 including a durability upper limit and the number of times of use. The count value of the counter 804 is incremented according to use status such as the number of times of use of a component, a time period which has passed after a component is mounted, and the number of printed pages. The previous replacement date and the count value are updated every time a component is replaced.

The control unit 201 acquires data from the printing apparatus 102 in step S701 and then, in step S702, the control unit 201 causes the display unit 202 to display the UI of the print workflow and waits for the operator to input contents of the print workflow.

In step S703, the control unit 201 confirms that the operator inputs the contents and then compares the state of wastage of the components in the printing apparatus 102 acquired in step S701 with the contents of the print workflow input in step S702 to determine whether the components need to be replaced. More specifically, if the remaining durability upper limit of the component is smaller than a value newly added by the print job generated by the print workflow, the control unit 201 determines that a target component needs to be replaced in midstream while the printing apparatus is performing the print job. If the control unit 201 determines that the component needs to be replaced (YES in step S703), the processing proceeds to step S708.

If the control unit 201 determines that the component does not need to be replaced (NO in step S703), in step S704, the control unit 201 causes the print job generation unit 205 to generate the print job based on the print workflow. In step S705, the control unit 201 causes the communication unit 207 to transmit the generated print job to the printing apparatus 102. In step S706, the control unit 201 acquires a processing status of the print workflow from the printing apparatus 102 via the communication unit 207.

In step S707, the control unit 201 determines whether the print job is completed. If the control unit 201 determines that the print job is not completed (NO in step S707), the processing returns to step S706 to repeat a processing state of the print job. If the control unit 201 determines that the process of the print job is completed (YES in step S707), the processing is ended. At this point, the control unit 201 finishes the process of the print job and causes the display unit 202 to display an indication that the print workflow is ended.

If the control unit 201 determines that the component needs to be replaced (YES in step S703), in step S708, the control unit 201 accesses the component management database 104 via the communication unit 207 to acquire information about a replacement worker for each component.

FIG. 9 is a table illustrating an example of information about component replacement workers stored in the component management database 104 illustrated in FIG. 1.

In the present exemplary embodiment, an ID 902, a worker 903, image quality adjustment 904, hardware (HW) adjustment 905, replacement procedure 906, and standard work time 907 are managed for each component name 901. If the control unit 201 determines that a component can be replaced by an operator or a serviceman as a worker who replaces the component, an html file to be acquired for displaying information about operation procedure associated with component replacement processing is set to the replacement procedure 906.

In FIG. 9, for example, values of "OP" and "SR" are stored in "worker" key of the database. "OP" represents an operator who performs the operation of the printing apparatus 102 and "SR" represents a serviceman specializing in maintenance. Components which can be replaced by the operator include the ones in which components and peripheral components are packaged to facilitate replacement and installation or the ones that can be safely replaced.

On the other hand, components which need to be replaced by the serviceman include the one which requires special knowledge and involves decomposition of the apparatus in the replacement work (a heat fixation unit, a photosensitive drum, and a conveyance belt, for example) and the one which is dangerous if an appropriate procedure is not performed in the replacement work (a charging device, for example).

In step S709, the control unit 201 refers to the "worker" key indicating the worker performing the replacement work in the database information acquired in step S708. The control unit 201 determines whether the component can be replaced by the operator or the serviceman based on the values stored in the "worker" key of components to be replaced.

If the component replaceable by the operator is replaced, in step S710, the control unit 201 determines whether the replacement of the component potentially affects print quality after the replacement. The control unit 201 refers to the component to be replaced using the "image quality adjustment 904" key in the information about the components indicated in the component management database 104 illustrated in FIG. 9. The components to which the value "1" is set are the ones whose replacement work potentially affects print quality. Further, in the "image quality adjustment 904" key, a value "CAL" indicates calibration processing and a value "CHI" indicates that image quality confirmation work by an operator or a serviceman are required, as processing for adjusting print quality after the replacement of the component.

If the control unit 201 determines that the value of "image adjustment" of the component to be replaced is "0" (NO in step S710), the processing proceeds to step S711. If the control unit 201 determines that the value of "image adjustment" thereof is "1" (YES in step S710), the processing proceeds to step S712.

In step S711, the control unit 201 determines whether the post-processing affects the quality of the print product after the component is replaced. At this point, the control unit 201 refers to the component to be replaced using the "hardware (HW) adjustment" key in the information about the components indicated in the component management database 104 illustrated in FIG. 9. The components to which the value "1" is set by the "hardware adjustment" key are the ones that potentially affect quality at the time of post-processing after replacement.

If the control unit 201 determines that the replacement of the component does not affect the quality of the print product (NO in step S711), the processing proceeds to step S713 and thereafter. The control unit 201 incorporates a replacement work into the print workflow so that the component is replaced at a time when the component needs to be replaced in the print workflow even in the midstream of printing process of the print job.

On the other hand, if the control unit 201 determines that the replacement of the component probably affects the quality of the print product (YES in step S711), in step S712, the control unit 201 incorporates a replacement work before the print job for which the replacement work is required and changes the contents of the print workflow. Then, the processing proceeds to step S704. In other words, in the present exemplary embodiment, if a component to be replaced is the one whose characteristic affects image quality or bookbinding quality, a component replacement process is incorporated before executing the print job in which the component needs to be replaced.

In step S712, the control unit 201 sets the print job after the component replacement work is set to the print job queue of the print job management unit 206 so that the component replacement work is executed before executing the print job for which the replacement work is required.

In step S711, if the control unit 201 determines to replace a component in the midstream of printing process of the print job as deemed appropriate, in step S713, the control unit 201 causes the step definition unit 204 to divide the print step of the print job at a time when the component replacement work is executed. After the print step of the print job is divided, in step S714, a required component replacement work is set between jobs of a plurality of the divided print steps and the processing proceeds to step S704.

In step S709, if the control unit 201 determines that the component to be replaced cannot be replaced by the operator based on the information acquired from the component management database 104, in step S715, the control unit 201 requests a serviceman to perform a component replacement work via the communication unit 207. At this point, the control unit 201 notifies the printing apparatus 102 of time when the component needs to be replaced by the serviceman based on the information acquired from the component management database 104.

After the control unit 201 sets the component replacement step to the print workflow in steps S712 and S714, in step S704, the control unit 201 causes the print job generation unit 205 to generate a print job from the print workflow. In step S705, the control unit 201 transmits the print job generated via the communication unit 207, to the printing apparatus 102 or the post-processing apparatus 103.

After the control unit 201 transmits the print job, in step S706, the communication unit 207 in the print workflow system receives a processing status in each device in asynchronization with the process of other print jobs. The communication unit 207 continues acquiring the processing status until the communication unit 207 receives a notification that the processing is completed from each device. When the communication unit 207 receives the notification of processing completion, the control unit 201 displays the completion of the processing on the display unit 202 along with the update of the print job queue in the print job management unit 206.

By this processing, the print workflow capable of reducing influence on image quality can be generated or corrected even if the component replacement step is incorporated in a case where the replacement of a component during the execution of the print job can affect image quality at the print step.

A process for setting the component replacement work in the print job queue of the print workflow system is described below with reference to FIG. 10.

FIG. 10 is a schematic diagram illustrating the enqueue process of the print job in the print job management unit 206 of the print workflow system according to the present exemplary embodiment.

In FIG. 10, a print job queue 1003 indicates that the print job management unit 206 stores a print job queue (JobID="C") 1002 in a print job queue 1001.

For example, it is assumed that a state 1004 of a development device (#2) component of the printing apparatus 102 shows that 46415 pages out of 50000 pages of durability upper limit have been already used for printing. At this point, it is assumed that a print job (JobID="D") 1005 which prints 100 copies of a print product where each copy is made of 50 pages is input in the print workflow system. Since 50 pages multiplied by 100 copies=5000 pages are printed in the entire print job, the durability life of the development device (#2) expires before all pages are printed to complete the print job.

In that case, the control unit 201 determines that a component replacement step 1006 occurs during the processing of the print job 1005. The control unit 201 acquires information about a replacement worker for the development device (#2) from the component management database 104.

As indicated in the worker 903 in FIG. 9, if the development device (#2) can be replaced by an operator (OP), the control unit 201 determines whether the development device (#2) affects the image quality of the print product.

In this case, as indicated in the image adjustment 904, if the replacement of the development device (#2) probably affects the image quality of the print product after the replacement, it is undesirable to replace the component in midstream while the print job is being performed. For this reason, the component replacement step 1006 is set to a print job queue 1007 to replace the component before the processing of the print job is executed. After the component replacement work is performed, the print job 1005 is set to the print job queue 1007.

As an similar example, it is assumed that a state 1008 of a roller (#1) component of the printing apparatus 102 shows that 245666 pages out of 250000 pages of durability upper limit have been already used for printing. At this state, it is assumed that a print job 1009 which prints 300 copies of a print product where each copy is made of 20 pages is input in the print workflow system. Since 20 pages multiplied by 300 copies=6000 pages are printed in the entire print job, the durability life of the roller (#1) expires before all pages are printed. The control unit 201 determines that a component replacement step 1011 occurs during the processing of the print job 1009. The control unit 201 acquires information about a replacement worker from the component management database 104.

For example, as indicated in the worker 903 in FIG. 9, if the roller (#1) can be replaced by the operator (OP), the control unit 201 determines whether the replacement of the roller (#1) affects print quality and pre-processing quality with reference to the image quality adjustment 904 and the HW adjustment 905 in FIG. 9. If the control unit 201 determines that the roller (#1) does not affect the quality of the print product, the control unit 201 determines that the roller (#1) can be replaced during the processing of the print job.

The control unit 201 performs the print processing of the number of copies which can be processed before the replacement of the component, then, interrupts the print processing to replace the component, and processes the rest of the print job after the replacement, thereby constituting a print workflow. A plurality of print jobs is generated in the print job generation unit 205 based on the print workflow thus constituted. In the above example, the print workflow for processing the print job 1009 is defined as a print step 1010, the component replacement step 1011, and a print step 1012 after the replacement of the component.

Since the print job whose process is divided by component replacement step 1011 has the same JobSubID, the control unit 201 can determine that the print job derives from the same print job.

The print job management unit 206 stores print jobs 1013 and 1015 and a component replacement step 1014 in a print job queue 1016.

The following describes an example of the print workflow which is constituted by the print workflow system executing the processing according to the present exemplary embodiment and in which the replacement of a component is defined in the midstream of print processing.

Figure 11:
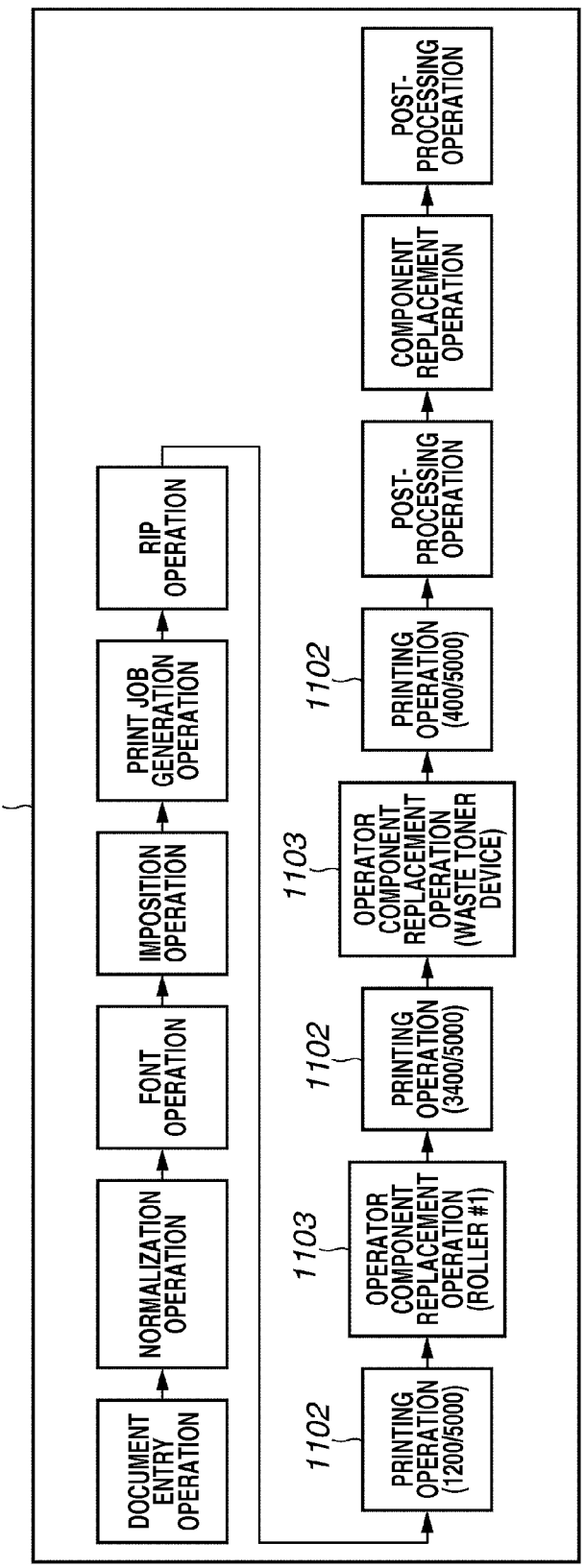
FIG. 11 is a block diagram illustrating an example of the print WF of the print workflow system.

FIG. 11 is a block diagram illustrating an example of the print workflow of the print workflow system according to the present exemplary embodiment. In a print workflow 1101 in FIG. 11, a print step 1102 performs a print step (which is a division print step and includes a preceding division print step and a succeeding division print step) several times while performing a component replacement step 1103 to replace a component.

The printing apparatus 102 prints 1200 pages according to the print workflow before a component is replaced and stops printing to cause the operator to replace a component. The operator replaces the roller (#1) and then the printing apparatus 102 resumes the print step.

The printing apparatus 102 executes printing of 3400 pages and then stops again to replace the component in accordance with the print workflow. After the print step is stopped, the operator replaces a waste tonner device in the printing apparatus 102. After the operator replaces the waste tonner device, the printing apparatus 102 executes again printing of 400 pages. At this point, the printing apparatus 102 performs printing of remaining 400 (400/5000) pages.

FIG. 12 is an example of a work list of the operator in the display unit 302 of the printing apparatus 102 according to the first exemplary embodiment. The operator performs processing of the print job corresponding to each print workflow displayed in the work list 1201 while confirming the work. A print step 1202 of the print job and a component replacement step 1203 of the printing apparatus 102 are displayed in order of processing. A plurality of steps included in the same print job is managed by JobID inherent in the print job and a plurality of JobSubID 1204 associated with the JobID.

The print processing time of each print job is calculated from the number of prints for each copy and the number of copies. Work time at the component replacement step is calculated based on time predetermined in a standard work time 907 in the component management database illustrated in FIG. 9. A work estimation time 1205 of the operator is displayed by totalizing processing contents included in the print workflow and the replacement processing estimated from the state of components of the printing apparatus.

Described below is a second exemplary embodiment including processing in which a newly generated print job interrupts the print job queue in a state where print job groups are already existing.

Figure 13:
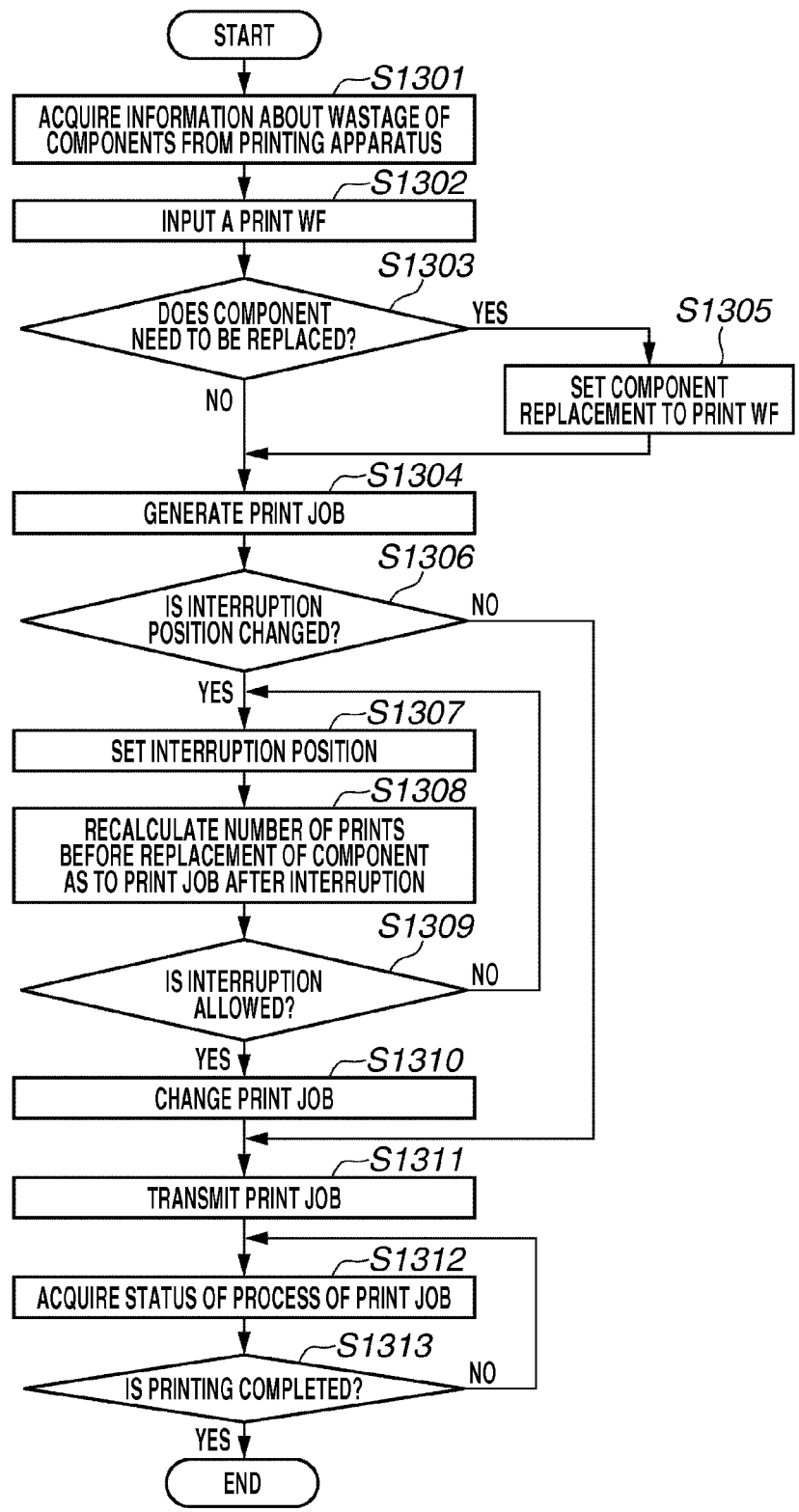
FIG. 13 is a flow chart illustrating a data processing method of the printing system.

FIG. 13 is a flow chart illustrating a data processing method of the printing system according to the present exemplary embodiment. According to this example, a print workflow is generated and processed when causing a newly registered print job to interrupt between any of print jobs on the print job queue managed by the print workflow system 101.

Each step in the flow chart is realized by the CPU functioning as the control unit 201 of the print workflow system 101 loading a control program from the external storage device such as a HDD onto a RAM and executing the control program.

If an interruption of printing of the existing print job groups is requested, to process beforehand the succeeding print job in the print job queue, the print workflow system recalculates whether a component replacement step is required with respect to print jobs subsequent to the interrupting print job. If the component replacement is required, change is reflected in the corresponding print job. The detailed description of the processing similar to that in the first exemplary embodiment is omitted below.

In step S1301, the control unit 201 of the print workflow system 101 acquires the state of wastage of the components used in the printing apparatus 102. In step S1302, the display unit 202 of the print workflow system 101 waits for the input of the print workflow (print WF) from the operator. In step S1303, the control unit 201 determines whether the component needs to be replaced during the processing, from the contents of the printing apparatus 102 and the print workflow. If the control unit 201 determines that the component needs to be replaced (YES in step S1303), in step S1305, the control unit 201 defines the component replacement step in the print workflow. In step S1304, the control unit 201 generates a print job.

A new print job generated from the print workflow is normally added to the tail of the print job group in the print job queue if nothing is specified and the processing is performed in the order that the print job is stored in the print job queue. However, if other print jobs are already managed in the print job queue, the operator can change the processing order of each print job before the processing, depending on request of the customer or a processing need.

Figure 14:
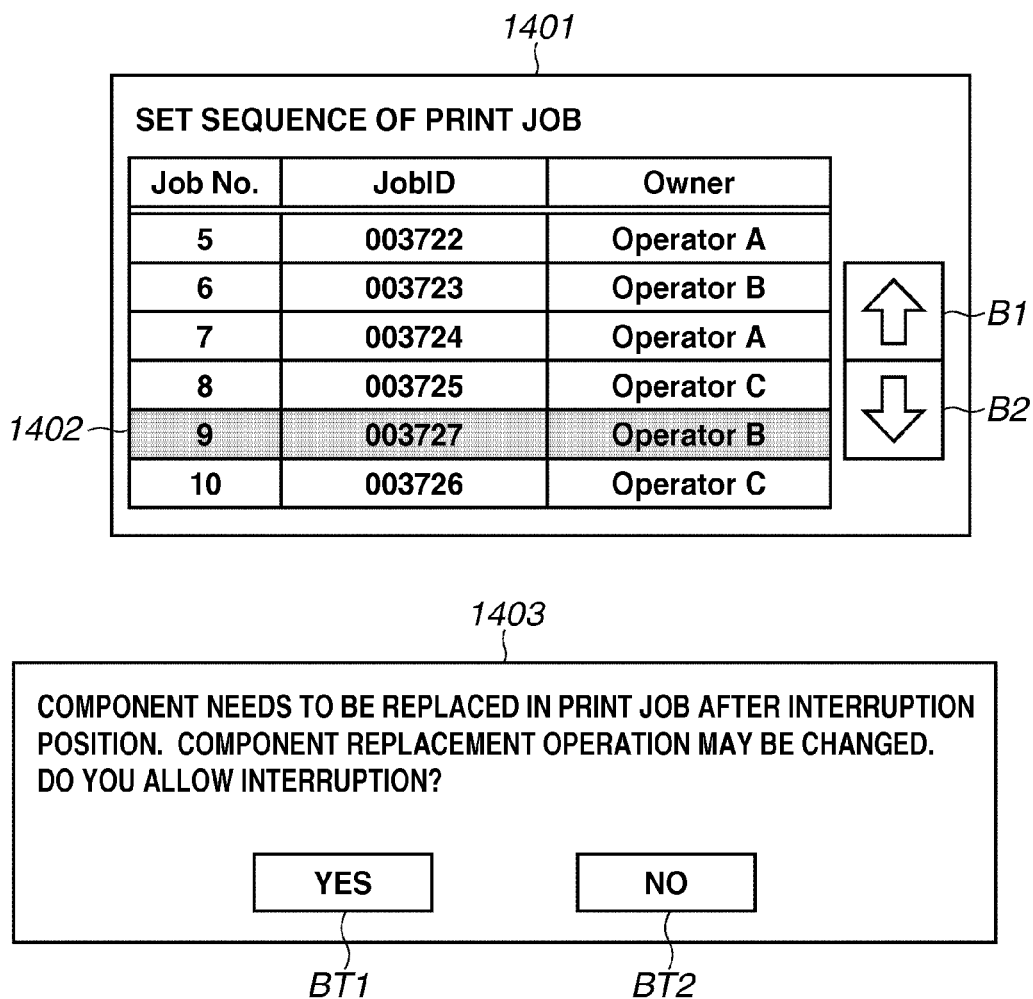
FIG. 14 illustrates a user interface which can be displayed by the printing system.

FIG. 14 illustrates an example of the user interface (UI) displayed by the display unit 202 illustrated in FIG. 2. The example illustrates a UI screen for setting the interruption position of the print job.

FIG. 14 illustrates a print job queue 1401 already transmitted to the printing apparatus and a print job group 1401 managed therein. A new print job 1402 is added to the tail of the print job group in the print job queue.

The operator of the print workflow system 101 selects any print job in the print job queue in the UI and presses an up and down button B1 to allow the order of the print job to be changed. In other words, the control unit 201 manages the print workflow using the job queue to allow the newly input print job to interrupt the order of job execution.

In step S1306, the control unit 201 of the print workflow system 101 determines whether the operator has given an instruction to change processing order of the print job on the display unit 202. If the control unit 201 determines that the processing order is changed (YES in step S1306), in step S1307, the control unit 201 accepts change in the processing order of the print job, i.e., setting of an interruption position, in accordance with the up and down button B1 instructed by the operator.

After that, in step S1308, the control unit 201 recalculates whether the component replacement step needs to be set to print jobs in the interruption position and thereafter in the print job queue under the condition that the print job is interrupted.

If the component replacement step set in the print jobs following the interrupting print job is changed or a new setting is required, the control unit 201 causes the display unit 202 to display a dialog 1403 in FIG. 14 so that the operator can confirm interruption. The control unit 201 determines whether the operator confirms the dialog 1403 and issues instructions for allowing interruption (Interruption Allowed). More specifically, the control unit 201 determines whether the button BT1 is pressed in the dialog 1403 illustrated in FIG. 14. If the control unit 201 determines that the button BT2 is pressed, the processing returns to step S1307.

On the other hand, in step S1309, if the control unit 201 determines that the button BT1 is pressed, the control unit 201 proceeds to step S1310 and changes the print job of the print job queue.

The above processing allows the print workflow system to perform the interruption processing of the print job in consideration of the component replacement step for the existing print jobs in the print job queue.

Thereby, there is no need for the operator to perform the redefinition of the processing step, which is caused by the interruption, in the print workflow corresponding to the existing print job and an effect of simplifying an operation is achieved.

A third exemplary embodiment is described below in which different processing is carried out depending on whether the replacement worker is an operator or a serviceman if a component needs to be replaced in the printing apparatus 102.

Figure 15:
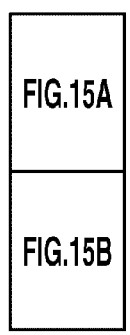
FIG. 15 includes FIG. 15A and FIG. 15B and is a flow chart illustrating a data processing method of the printing system.
Figure 15A:
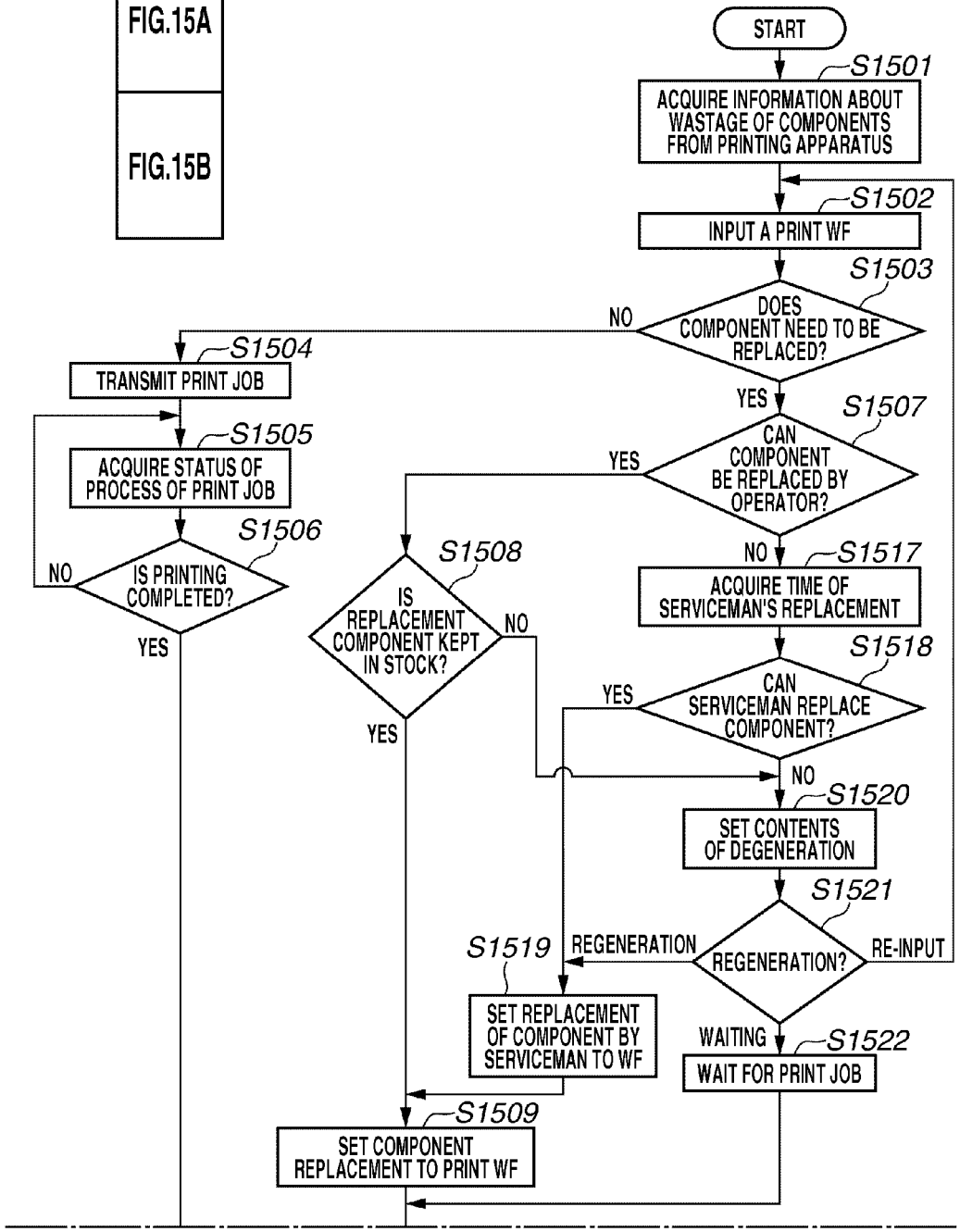

FIG. 15 is a flow chart illustrating a data processing method of a printing system according to the present exemplary embodiment. The present exemplary embodiment is an example in which the printing apparatus 102 forms a plurality of degeneration print steps in which the print step in the generated print workflow is degenerated under a condition that the print step in the formed print work flow can be performed, to update the print workflow if the control unit 201 determines that a component can be replaced by the serviceman.

Each step in the flow chart is realized by the CPU functioning as the control unit 201 of the print workflow system 101 loading a control program from the external storage device such as a HDD onto a RAM and executing the control program.

The outline of workflow of the print workflow system 101 according to the present exemplary embodiment is described below.

The control unit 201 of the print workflow system 101 determines whether a component to be replaced can be replaced by an operator or a serviceman in the print workflow in which a component needs to be replaced. If the component to be replaced can be replaced by the operator, the operator determines whether a usable replacement component is kept in stock. If the replacement component is kept in stock, the operator replaces the component.

If the replacement component is not kept in stock, the contents of the print workflow are changed to avoid the influence of the replacement component and degenerated to allow processing by the printing apparatus 102 before the replacement of the component.

If the component need to be replaced by the serviceman, a replacement work may not be quickly performed if a serviceman's schedule is full or the serviceman is at a remote location. Also at this time, the contents of the print job are changed and degenerated to be the print job which can be processed by the printing apparatus before the serviceman replaces the component.

Since the component replacement procedure is displayed on the display unit of the printing apparatus at the time of a component replacement work performed by the operator, operator's replacement work is facilitated.

In the following flow chart, the detailed description of the processing similar to that in the first and second exemplary embodiments is omitted.

The control unit 201 of the print workflow system 101 acquires the state of wastage of the components used in the printing apparatus 102. In step S1502, the display unit 202 of the print workflow system 101 waits for the input of the print workflow from the operator.

After the print workflow is input, in step S1503, the control unit 201 determines whether a component needs to be replaced in the printing apparatus 102 based on the input contents and information about the component of the printing apparatus 102. If the control unit 201 determines that the component does not need to be replaced (NO in step S1503), the control unit 201 proceeds to step S1504 to transmit the print job to the printing apparatus 102. In step S1505, the control unit 201 acquires the status of processing of the print job from the printing apparatus 102. In step S1506, the control unit 201 determines whether the print job is completed. If the control unit 201 determines that the processing of the print job transmitted to the printing apparatus 102 in step S1504 is completed (YES in step S1506), the processing is ended.

On the other hand, if the control unit 201 determines that the component needs to be replaced (YES in step S1503), the control unit 201 determines whether the operator or the serviceman can replace the component to be replaced. If the control unit 201 determines that the operator can replace the component, in step S1508, the control unit 201 confirms whether the component to be replaced is kept in stock with reference to a stock table.

If the control unit 201 determines that a replaceable component is kept in stock (YES in step S1508), the control unit 201 proceeds to step S1509 to set the component replacement step to the print workflow. The print workflow system 101 transmits the print job to the printing apparatus 102 to perform print processing therein.

In step S1511, the control unit 201 of the print workflow system 101 acquires the status of processing in the printing apparatus 102. In step S1512, if work for replacing a component of the printing apparatus 102 occurs during print processing, in step S1513, the control unit 201 connects with the component management database 104 via the communication unit 207 to acquire information about the replacement procedure 906 illustrated in FIG. 9.

In step S1514, the control unit 201 displays the information about the replacement procedure 906 acquired from the component management database 104 on the display unit 202. More specifically, if the control unit 201 determines that the component can be replaced by the operator, the processing for displaying the information about the replacement procedure 906 in the component replacement processing is executed and display is produced on the display unit 202. Thereby, the operator can appropriately acquire information necessary for the component replacement work with which the operator is unfamiliar.

In step S1515, the operator unfamiliar with the component replacement work replaces a component based on the display processing in step S1514 and a skilled operator replaces a component irrespective of the display processing in step S1514.

In step S1516, the control unit 201 determines whether the print job transmitted to the printing apparatus 102 is completed from the status of processing of the print job. If the control unit 201 determines that the print job is not completed (NO in step S1516), the processing returns to step S1511. If the control unit 201 determines that the print job is completed (YES in step S1516), the processing is ended.

In step S1507, if the control unit 201 determines that a component cannot be replaced by the operator, in step S1517, the control unit 201 acquires the time when the serviceman can complete the work for replacing the component which needs to be replaced by the serviceman, via the communication unit 207. In step S1518, the control unit 201 determines whether the serviceman can complete the component replacement work before the printing apparatus 102 starts processing the print job.

If the control unit 201 determines based on the acquired time that the serviceman can complete the component replacement work before the printing apparatus 102 starts processing the print job (YES in step S1518), in step S1519, the control unit 201 causes the step definition unit 204 to set the component replacement step to be performed by the serviceman to the print workflow. After that, the control unit 201 executes processing in step S1509 and thereafter.

In a print workflow 1601 illustrated in FIG. 16, a component replacement step 1602 is defined prior to a printing step 1603.

On the other hand, if the control unit 201 determines that the serviceman cannot complete the component replacement work before the printing apparatus 102 starts processing the print job (NO in step S1518), in step S1520, the setting of the print workflow of the print job is changed under a feasible condition before a component is replaced in the printing apparatus 102, and the contents of degeneration are defined.

The contents of degeneration processing performed by the control unit 201 include the change of the number of prints and the deletion of print post-processing such as staple. A difference from the initial print job is defined in the print workflow so that the difference processing is executed in the printing apparatus 102 after the serviceman completes the component replacement work.

The print workflow 1604 in FIG. 16 illustrates that the number of copies of the print job is changed to allow printing of the number of copies which can be processed before the replacement of a component because a serviceman's replacement of a component 1606 of the printing apparatus cannot be performed before the print processing for the print job is started (1605).

The print workflow 1604 illustrated in FIG. 16 is set such that processing for the number of copies of the print job which cannot be processed before a component is replaced is performed after the component is replaced (1607).

In step S1520, the control unit 201 defines the contents of degeneration of the print workflow. In step S1521, the display unit 202 displays the contents of degeneration for the operator and waits for operator's input which selects whether to perform the degenerated print workflow.

If the control unit 201 determines that the display unit 202 receives instructions from the operator that the degenerated print workflow is performed, the control unit 201 proceeds to step S1519 to set the print workflow including the serviceman's component replacement work step based on the print job degenerated in the step definition unit 204.

On the other hand, if the control unit 201 determines that the display unit 202 receives again instructions from the operator that the print workflow is to be set without performing the degenerated print workflow, the control unit 201 proceeds to step S1502 to cause the operator to input again the print workflow.

On the other hand, in step S1521, if the control unit 201 determines that the display unit 202 gives instructions to wait for the serviceman's component replacement without changing the print workflow to perform the processing according to the initially input print workflow, the control unit 201 proceeds to step S1522 to wait for the print job. When the operator releases a waiting state after the serviceman finishes replacing of a component, in step S1510, the control unit 201 transmits the print job to the printing apparatus 102 via the communication unit 207 to cause the communication unit 207 to process the print job.

According to the above processing, if a component cannot be quickly replaced by the operator or the serviceman, it is possible to minimize the influence of component replacement in the print workflow.

Further, a replacement procedure for the operator replacing a component is displayed, which improves work efficiency.

A fourth exemplary embodiment is described below. If a component fails in any device constituting the print system, a component which can be replaced by the operator is replaced by the operator as a step of the print flow, as described in the first exemplary embodiment. However, if a replacement component is not kept in stock, replacement work may be retarded until the component is procured. In this situation, in a print system environment in which a plurality of similar apparatuses is operated, a component may be replaced using a component acquired by stopping another apparatus.

In such a case, the print workflow system determines whether a necessary component can be extracted from another target apparatus. If the control unit 201 determines that the component can be extracted, whether a component needs to be replaced during processing is anew calculated in the print job of the apparatus from which the component is extracted, and the print workflow is changed. Information about wastage of the component to be extracted is transmitted from the apparatus from which the component is extracted, to the apparatus where a component is replaced, at the time of replacing the component, so that the component body and information about the component are taken over and managed. The exemplary embodiment in this case is described below.

Figure 17:
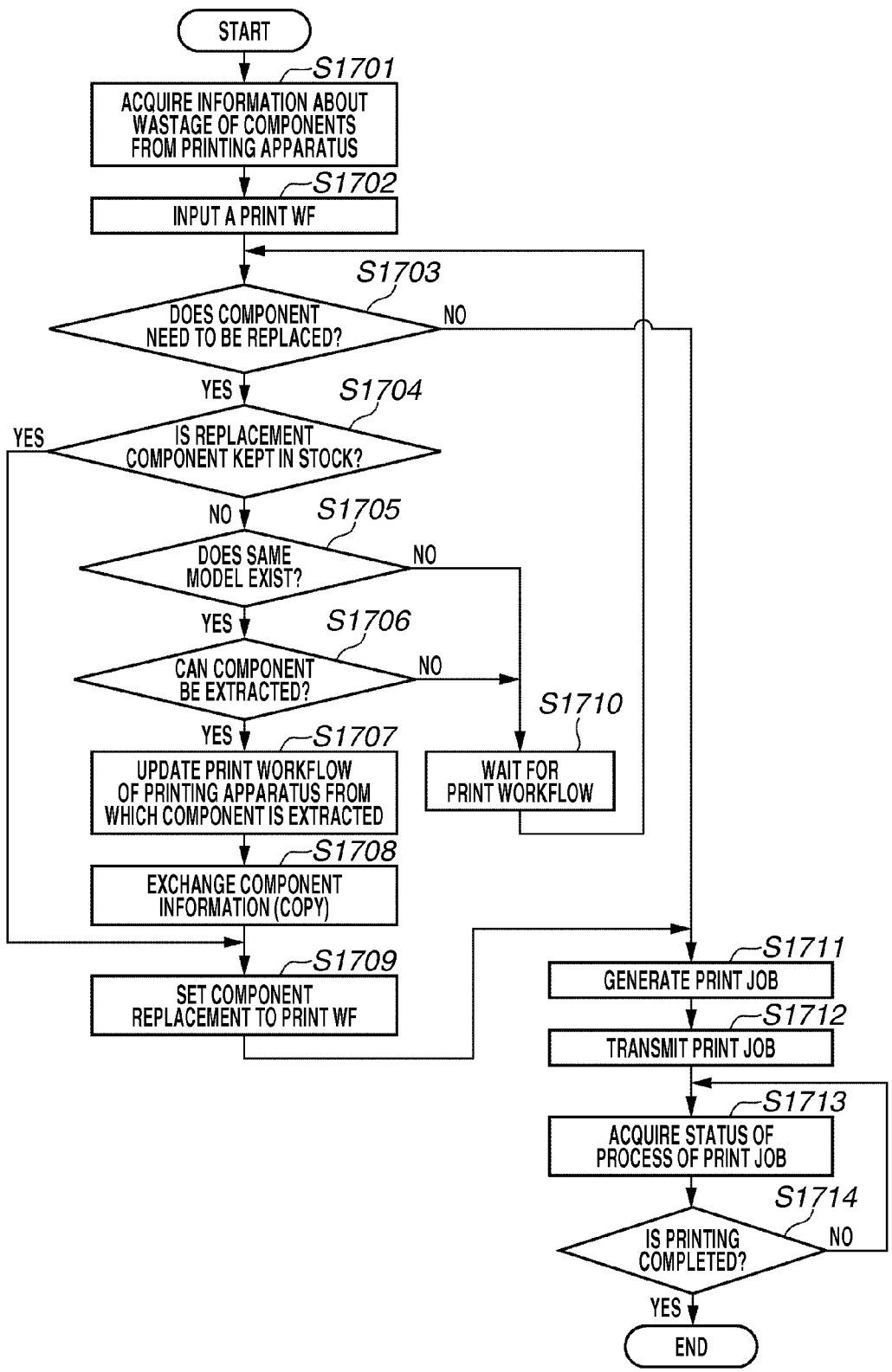
FIG. 17 is a flow chart illustrating a data processing method of the printing system.

FIG. 17 is a flow chart of a data processing method of the printing system according to the present exemplary embodiment. In the present exemplary embodiment, as an example, a component is replaced using a component of another apparatus in the print workflow set by the print workflow system 101. More specifically, the example assumes a printing system including a plurality of printing apparatuses related to the execution of the print job and a plurality of post-processing apparatuses which post-process the sheet material output from the plurality of printing apparatuses.

If the printing system determines that the component needs to be replaced in any one of the printing apparatuses, the control unit 201 performs component procurement determination process which determines whether a component used in another apparatus is in a usable state. If the control unit 201 determines that the component used in another apparatus is in a usable state, in the updating processing, a component procurement step is incorporated in the created print workflow. Each step in the flow chart is realized by the CPU functioning as the control unit 201 of the print workflow system 101 loading a control program from the external storage device such as a HDD onto a RAM and executing the control program. The description of the processing similar to that in the first to third exemplary embodiments is omitted herein.

In step S1701, the control unit 201 of the print workflow system 101 acquires the state of wastage of the components used in the printing apparatus 102.

In step S1702, the control unit 201 waits for the operator to input the print workflow into the screen displayed on the display unit 202. In step S1703, when the display unit 202 detects the input from the operator, the control unit 201 determines whether the component needs to be replaced during the processing, from the contents of the printing apparatus 102 and the print workflow.

If the control unit 201 determines that the component does not need to be replaced (NO in step S1703), the processing proceeds to step S1711. If the control unit 201 determines that the component needs to be replaced (YES in step S1703), in step S1704, the control unit 201 determines whether the component to be replaced is kept in stock. If the print workflow system determines that the control unit 201 determines that the component is kept in stock (YES in step S1704), the processing proceeds to step S1709 to set the component replacement step in the print workflow.

On the other hand, if the control unit 201 determines that the component is not kept in stock (NO in step S1704), in step S1705, the control unit 201 of the print workflow system acquires information registered in the component management database 104 about configuration of the printing system (including model information about the printing apparatus) to determine whether there is a model using a component similar to the component to be replaced.

If the control unit 201 determines that there is a model using the similar component (YES in step S1705), in step S1706, the print workflow system determines whether a component can be extracted from an apparatus from which the component is extracted. The print workflow system refers to whether the apparatus processes the print job while the component is being extracted. If the print workflow system determines that the apparatus will not be operated, the component is determined as a candidate for the component which can be extracted.

Even though the printing apparatus from which a component is extracted operates when extracting the component, the component that is not commonly used for all print workflows, for example, a component used in the processing typified by the post-processing, is determined as a component which can be extracted if the print workflow does not include the processing related to the component.

In step S1706, the control unit 201 also causes the display unit 202 to display whether the component can be extracted and waits for input from the operator.

If the control unit 201 determines that instructions that the component can be extracted are received from the operator (YES in step S1706), in step S1707, the control unit 201 inserts the component replacement step into the print job queue to perform extraction work in the printing apparatus from which the component is extracted. The control unit 201 performs recalculation related to the component replacement step of the existing print workflow under the condition that a target component is extracted from the printing apparatus from which the component is extracted, and updates contents of the print workflow.

On the other hand, if the control unit 201 determines that there is no model from which the component is extracted (NO in step S1705), or if the control unit 201 determines that instructions that the component cannot be extracted are received from the operator (NO in step S1706), the control unit 201 proceeds to step S1710 to cause the print workflow to wait and returns to step S1703.

More specifically, in a waiting state, the control unit 201 causes the display unit 202 to indicate a stand-by, and waits for the operation of releasing the stand-by by the operator. If the control unit 201 confirms that the operator releases the stand-by in the display unit 202, the control unit 201 proceeds to step S1703 to determine again whether the component needs to be replaced in the print workflow.

If a component is extracted from another printing apparatus, the processing proceeds from step S1707 to step S1708 to acquire information about wastage of the component to be replaced, from the component management database of the printing apparatus from which the component is extracted, via the communication unit 305. The control unit 201 causes the component management database 306 of the printing apparatus which replaces the component, to manage the acquired information. At the same time, the control unit 201 updates the component setting of the component management database of the printing apparatus from which the component is extracted, to an extraction state.

In step S1709, the control unit 201 sets the component replacement step to the print workflow. A print job is generated based on the print workflow and print job processing and component replacement processing are performed according to the print workflow. After that, steps S1711 to S1714 are executed and the processing is ended.

In the print workflow which requires component replacement work, if a replacing component is not quickly available, the above processing allows selection and execution of processing in which a component is replaced with a component extracted from another apparatus in consideration of the print workflow of another apparatus.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable storage medium may store a program that causes a printing system or an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-144658 filed Jun. 29, 2011, which is hereby incorporated by reference herein in its entirety.

What is claimed is:

1. A printing system, comprising:
a post-processing apparatus configured to apply post processing to a sheet material output from a printing apparatus related to execution of a print job; and
an information processing apparatus configured to manage a print workflow that includes operations arranged order of process in a plurality of operation positions, wherein the information processing apparatus includes:
a generation unit configured to generate, in accordance with a print setting condition set to the print job, a first print workflow,
an acquisition unit configured to acquire operation information related to a replacement schedule of components of the printing system,
a determination unit configured to determine, based on the operation information acquired by the acquisition unit and the print setting condition set to the print job, whether a target component will need to be replaced during the execution of the print job,
a distinguishing unit configured to distinguish, in response to the determination unit determining that the target component will need to be replaced during the execution of the print job, whether the target component is a part of the printing system whose characteristic affects quality of the output sheet material,
a decision unit configured to decide, according to the distinguishing of the target component characteristic by the distinguishing unit, an operation position at which a component replacement operation associated with the target component is to be incorporated into the plurality of operation positions of the first print workflow, and
an update unit configured to update the first print workflow generated by the generation unit to create a second print workflow by incorporating the component replacement operation into the plurality of operation positions of the generated first print workflow at the operation position decided by the decision unit,
wherein the decision unit decides to incorporate the component replacement operation associated with the target component before execution of a print job for which replacement of the target component is required, in a case where the distinguishing unit distinguishes that the target component is a part of the printing system whose characteristic affects quality of the output sheet material.

2. The printing system according to claim 1, wherein the information processing apparatus further includes a display control unit configured to display the first print workflow generated by the generation unit or the second print workflow from the updated of the first print workflow by the update unit.

3. The printing system according to claim 1, wherein the information processing apparatus further includes a discrimination unit configured to discriminate as to whether the target component is to be replaced by an operator or by a service person,
wherein, in response to (i) the determination unit determining that the target component will need to be replaced during the execution of the print job and (ii) the discrimination unit discriminating that the target component is to be replaced by the operator, the distinguishing unit distinguishes whether the target component is a part of the printing system whose characteristic affects quality of the output sheet material.

4. The printing system according to claim 3, wherein, in response to (i) the determination unit determining that the target component will need to be replaced during the execution of the print job and (ii) the discrimination unit discriminating that the target component is to be replaced by the service person but that the service person cannot replace the target component, the distinguishing unit changes the print operation in the first print workflow into a plurality of degeneration print operations.

5. The printing system according to claim 3, wherein the information processing apparatus further includes a replacement procedure display unit configured to display information about operation procedure associated with component replacement processing in response to the discrimination unit discriminating that the target component can be replaced by the operator.

6. The printing system according to claim 1, wherein, in response to the distinguishing unit distinguishing that the target component is a part of the printing system whose characteristic affects quality of the output sheet material, the decision unit decides that the operation position at which the component replacement operation is to be incorporated into the plurality of operation positions is before the execution of the print job which requires replacement of the target component.

7. The printing system according to claim 1, wherein the information processing apparatus further includes a division unit and, in response to the distinguishing unit distinguishing that the target component is a part of the printing system whose characteristic does not affect quality of the output sheet material,
the division unit divides the print operation of the print job into at least a preceding operation of division print and a subsequent operation of division print, and
the update unit creates the second print workflow by incorporating the component replacement operation between the preceding operation of division print and the subsequent operation of division print.

8. The printing system according to claim 1, wherein the information processing apparatus further includes a management unit configured to manage the first print workflow such that a newly input print job can interrupt an order of execution using a job queue, and
wherein the determination unit determines whether the target component needs to be replaced during the execution of the print job, based on the operation information acquired by the acquisition unit and the print setting condition set to the print job every time a newly input print job interrupts an order of execution.

9. The printing system according to claim 1, wherein a plurality of post-processing apparatuses are configured to apply post processing to a sheet material output from a plurality of printing apparatuses related to the execution of a print job, and
wherein the information processing apparatus manages a print workflow by associating an operation executed by the plurality of post-processing apparatuses with a second operation performed by an operator managing the second operation or a service person maintaining the plurality of printing apparatuses.

10. The printing system according to claim 9, wherein the determination unit includes a component procurement determination unit configured to determine whether a source component used in another apparatus including the source component is in a usable state in response to the determination unit determining that a target component needs to be replaced in any one of the plurality of printing apparatuses, and
wherein, in response to the component procurement determination unit determining that the target component is in a usable state, the update unit incorporates a component procurement determination operation in the first print workflow generated by the generation unit.

11. The printing system according to claim 1, wherein the target component of the printing system (i) is other than a consumable, (ii) is a mechanical and/or electrical part of the printing system configured to be worn by print processing, or (iii) is associated with a remaining durability as a state of wastage.

12. The printing system according to claim 11, wherein a target component whose characteristic affects quality of image on a sheet is one of a toner, a roller, a waste toner device, a development device, a fixing device, a power supply unit, and wherein a target component whose characteristic affects quality of the output sheet material is one of a paper punching device, a cutting edge, and a cutting roller.

13. The printing system according to claim 1, wherein, when a durability upper limit of the target component is smaller than a count value, of the target component, that is predicted to be newly added by the print job as generated by the first print workflow, the determination unit determines that the target component will need to be replaced during the execution of the print job.

14. The printing system according to claim 1, wherein the update unit incorporates the component replacement operation into the plurality of operation positions of the generated first print workflow at the operation position decided by the decision unit as a first operation, wherein the second print workflow associates the post-processing operation with the first operation by positioning the first operation before and adjacent to the post-processing operation in the second print workflow or positioning the first operation within the post-processing operation in the second print workflow.

15. A workflow management method for a printing system having a post-processing apparatus and an information processing apparatus, wherein the post-processing apparatus is configured to apply post processing to a sheet material output from a printing apparatus related to execution of a print job and the information processing apparatus is configured to manage a print workflow that includes operations arranged order of process in a plurality of operation positions, the workflow management method comprising:

generating, in the information processing apparatus and in accordance with a print setting condition set to the print job, a first print workflow;
acquiring, in the information processing apparatus, operation information related to a replacement schedule of components of the printing system;
determining, in the information processing apparatus and based on the acquired operation information and the print setting condition set to the print job, whether a target component will need to be replaced during the execution of the print job;
distinguishing, in the information processing apparatus and in response to determining that the target component will need to be replaced during the execution of the print job, whether the target component is a part of the printing system whose characteristic affects quality of the output sheet material;
deciding, in the information processing apparatus and according to the distinguishing of the target component characteristic, an operation position at which a component replacement operation associated with the target component is to be incorporated into the plurality of operation positions of the first print workflow; and
updating, in the information processing apparatus, the generated first print workflow to create a second print workflow by incorporating the component replacement operation into the plurality of operation positions of the generated first print workflow at the decided operation position,
wherein deciding includes incorporating the component replacement operation associated with the target component before execution of a print job for which replacement of the target component is required, in a case where it is distinguished that the target component is a part of the printing system whose characteristic affects quality of the output sheet material.

16. A non-transitory computer-readable storage medium storing a program to cause a printing system having a post-processing apparatus and an information processing apparatus to perform a workflow management method, wherein the post-processing apparatus is configured to apply post processing to a sheet material output from a printing apparatus related to execution of a print job and the information processing apparatus is configured to manage a print workflow that includes operations arranged order of process in a plurality of operation positions, the workflow management method comprising:

generating, in the information processing apparatus and in accordance with a print setting condition set to the print job, a first print workflow;
acquiring, in the information processing apparatus, operation information related to a replacement schedule of components of the printing system;
determining, in the information processing apparatus and based on the acquired operation information and the print setting condition set to the print job, whether a target component will need to be replaced during the execution of the print job;
distinguishing, in the information processing apparatus and in response to determining that the target component will need to be replaced during the execution of the print job, whether the target component is a part of the printing system whose characteristic affects quality of the output sheet material;
deciding, in the information processing apparatus and according to the distinguishing of the target component characteristic, an operation position at which a component replacement operation associated with the target component is to be incorporated into the plurality of operation positions of the first print workflow; and updating, in the information processing apparatus, the generated first print workflow to create a second print workflow by incorporating the component replacement operation into the plurality of operation positions of the generated first print workflow at the decided operation position, wherein deciding includes incorporating the component replacement operation associated with the target component before execution of a print job for which replacement of the target component is required, in a case where it is distinguished that the target component is a part of the printing system whose characteristic affects quality of the output sheet material.

* * * * *